US009989018B2

United States Patent
Dudar

(10) Patent No.: US 9,989,018 B2
(45) Date of Patent: Jun. 5, 2018

(54) SYSTEM AND METHODS FOR FUEL SYSTEM RECIRCULATION TUBE DIAGNOSTIC

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 14/993,314

(22) Filed: Jan. 12, 2016

(65) Prior Publication Data
US 2017/0198662 A1 Jul. 13, 2017

(51) Int. Cl.
F02M 25/08 (2006.01)
F02D 41/00 (2006.01)
F02M 37/00 (2006.01)

(52) U.S. Cl.
CPC ..... *F02M 25/0818* (2013.01); *F02D 41/0045* (2013.01); *F02M 25/0836* (2013.01); *F02M 25/0854* (2013.01); *F02M 37/0082* (2013.01); *F02M 25/0809* (2013.01)

(58) Field of Classification Search
CPC ........... F02M 25/0818; F02M 25/0836; F02M 25/0854; F02M 37/0082; F02D 41/0045; F02D 41/0032; F02D 41/0037; F02D 41/004
USPC ..... 123/520, 518; 73/114.38, 114.39, 114.43
See application file for complete search history.

(56) References Cited

U.S. PATENT DOCUMENTS

| 6,082,337 | A | * | 7/2000 | Fujimoto | F02M 25/0809 123/520 |
|---|---|---|---|---|---|
| 6,192,742 | B1 | * | 2/2001 | Miwa | F02M 25/0809 123/520 |
| 8,108,127 | B2 | | 1/2012 | Grunwald et al. | |
| 8,155,917 | B2 | | 4/2012 | Maegawa | |
| 9,695,782 | B2 | * | 7/2017 | Tamura | F02M 25/0818 |
| 2001/0054415 | A1 | * | 12/2001 | Hanai | F02M 25/0809 123/520 |
| 2006/0130568 | A1 | * | 6/2006 | Ishii | F02M 25/0827 73/114.39 |
| 2015/0083088 | A1 | | 3/2015 | Pearce et al. | |
| 2015/0211952 | A1 | | 7/2015 | Yang et al. | |

(Continued)

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Methods and systems are provided for indicating restrictions in a fuel system vapor recirculation line. In one example, a fuel tank is evacuated responsive to a fuel level below a threshold, and if the vacuum is relieved via a negative pressure relief valve in a capless fuel filler system, the negative pressure relief valve is indicated to be functional such that, responsive to a fuel level greater than a threshold, the fuel system may be evacuated and a restriction may be indicated in the vapor recirculation line responsive to the negative pressure valve not relieving the applied vacuum. In this way, restrictions in the vapor recirculation line may be rapidly diagnosed and excessive loading of a fuel vapor canister may be prevented, thus reducing the potential for evaporative emissions being released to the atmosphere and prolonging fuel vapor canister function.

17 Claims, 7 Drawing Sheets

(56) References Cited

U.S. PATENT DOCUMENTS

2015/0361929 A1\* 12/2015 Tamura .............. F02M 25/0818
　　　　　　　　　　　　　　　　　　　　　　　73/114.39

\* cited by examiner

SYSTEM AND METHODS FOR FUEL SYSTEM RECIRCULATION TUBE DIAGNOSTIC

FIELD

The present description relates to systems and methods for controlling a vehicle engine to indicate a restriction in a fuel system vapor recirculation line.

BACKGROUND/SUMMARY

Vehicle emission control systems may be configured to store fuel vapors from fuel tank refueling and diurnal engine operations, and then purge the stored vapors during a subsequent engine operation. The fuel vapors may be stored in a fuel vapor canister coupled to the fuel tank which contains adsorbent material, such as activated carbon, capable of adsorbing hydrocarbon fuel vapor.

The fuel tank may be further coupled to a vapor recovery line (vapor recirculation line). The vapor recirculation line may be configured to circulate and/or hold a percentage of refueling vapors, thus limiting the rate of fuel vapor canister loading. Fuel vapors may recirculate back to the fuel tank by flowing through the vapor recirculation line, and then through a filler neck of the fuel tank. Further, depending on the fuel dispenser, the fuel vapors within the vapor recirculation line may be returned to the fuel dispenser, thus limiting the total fuel vapor stored within the fuel vapor canister for a given refueling event. Fuel vapor recirculation lines include orifices to regulate the fuel vapor flow rate through the recirculation line.

The fuel vapor recirculation line additionally serves a second purpose, including providing a path to the filler neck of the fuel tank in order to conduct diagnostic tests for undesired evaporative emissions from the filler neck. In an effort to meet stringent federal emissions regulations, entire evaporative emissions control systems and fuel systems need to be intermittently diagnosed for the presence of undesired evaporative emissions that could release fuel vapors to the atmosphere. In a typical evaporative emissions test, a vacuum is applied to the evaporative emissions control system and fuel system. In one example, the integrity of the systems are determined by comparing the resulting pressure to an expected pressure. The vacuum source may be the intake manifold of the vehicle engine. In some vehicles, such as hybrid electric vehicles, the vehicle engine may not run frequently, or may not generate enough vacuum to conduct an evaporative emissions test. Such vehicles may have an evaporative level check module (ELCM) coupled to the evaporative emission control system. The ELCM includes a vacuum pump that can be coupled to the fuel system for evaporative emissions testing. The fuel system vapor recirculation line provides a path to the filler neck of the fuel tank under conditions wherein high fuel levels in the fuel tank may block access of the applied vacuum to the fuel filler neck. In such cases, in the absence of a recirculation line, undesired evaporative emissions in the filler neck and fuel cap area may go undetected. As such, vapor recirculation lines serve to both limit the rate of fuel vapor canister loading, and to provide a path to the filler neck for evaporative emissions testing.

However, as the orifices in a recirculation line age, flow through the orifices may decrease. For example, the vapor recirculation line may become restricted, and as a result fuel vapors may not circulate through the vapor recirculation line, causing the canister loading rate (and total load) to increase. Excess loading of the canister may result in the release of hydrocarbons to the atmosphere. Additionally, during refueling, the pressure in the fuel tank may increase as fuel is added to the tank, the result of a restricted vapor recirculation line and an increased resistance to refueling due to additional loading of the fuel vapor canister. In some examples, the fuel pressure may increase to a level where the fueling is terminated before the fuel tank is full by an automatic shutoff mechanism. Furthermore, a restriction in the vapor recirculation line may isolate the fuel filler neck and fuel cap area from applied vacuum during an evaporative emissions test diagnostic, under conditions wherein the fuel level in the fuel tank additionally blocks access of the applied vacuum to the fuel filler neck and cap area via the fuel tank. Accordingly, diagnosing and mitigating potential restrictions in a vehicle's fuel system vapor recirculation line may serve to maintain vehicle compliance with federal evaporative emissions test regulations, may increase the functional lifespan of a vehicle's fuel vapor canister, and may prevent customer dissatisfaction due to premature automatic shutoffs of a refueling dispenser during vehicle refueling operations.

U.S. Patent Application US 20150083088 teaches a method of detecting blockages within a fuel system vapor recirculation line by measuring a rise in the interior temperature of a fuel vapor canister of the evaporative emissions control system during the process of refueling to indicate canister loading state. If the increase in canister loading state is not above a threshold level corresponding to an expected amount of canister loading based on the refueling event, then it is inferred that the recirculation line is not blocked and is operating reliably. However, the inventors herein have recognized potential issues with such a method. For example, fuel vapor canisters comprised of activated charcoal may lose adsorption efficiency over time, particularly if the activated charcoal becomes coated with liquid fuel, as may occur under conditions wherein a fuel tank is overfilled. Under such conditions, relying on a measurement of fuel vapor canister loading state during a refueling operation may not provide a reliable measurement of fuel system vapor recirculation line functionality. For example, if the adsorption efficiency of a fuel vapor canister has become compromised, a loading state may not be correctly inferred via temperature sensors comprised within the fuel vapor canister. Under such conditions, restrictions in the fuel system vapor recirculation line may go undiagnosed.

The inventors herein have recognized the above issues, and have developed systems and methods to at least partially address them. In one example the issues described above may be addressed by a method, comprising during a first condition, including a fuel tank fill level below a first threshold, applying vacuum to the fuel system and indicating a first fuel system pressure profile, and during a second condition, including a fuel tank fill level above a second threshold, applying vacuum to the fuel system and indicating a second fuel system pressure profile, and indicating a restriction in a vapor recirculation line based on the first and second fuel system pressure profiles.

As one example, a restriction in the vapor recirculation line is indicated responsive to both the first fuel system pressure profile including a vacuum relief inflection point during applying the vacuum in the first condition, and the second fuel system pressure profile not including a vacuum relief inflection point during applying vacuum in the second condition. The vacuum relief inflection point in both the first condition and the second condition may be understood to comprise an opening of a negative pressure relief valve in a fuel filler system. As such, during the first condition vacuum may be routed to the negative pressure relief valve through the fuel tank via a fuel filler neck, and during the second condition vacuum may be routed to the negative pressure relief valve solely by the vapor recirculation line. In this way, by monitoring fuel system pressure profiles under conditions wherein vacuum is differentially routed to the negative pressure relief valve, it may be determined whether a restriction is present in the vapor recirculation line.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

This detailed description relates to systems and methods for indicating whether a restriction is present in a fuel system vapor recirculation line. Specifically, the description relates to indicating whether a negative pressure relief valve in a capless fuel filler system is functional, and responsive to an indication that the negative pressure relief valve is functional, applying vacuum to the fuel system vapor recirculation line under conditions wherein a fuel level in a fuel tank is above a threshold, and indicating a restriction in the vapor recirculation line responsive to the negative pressure relief valve not relieving the applied vacuum. The system and methods may be applied to a vehicle system capable of powering the vehicle by an electric motor, such as the hybrid vehicle system depicted in FIG. 1. The fuel system may be coupled to an evaporative emissions control system, and the fuel system may comprise a fuel filler neck coupling the fuel tank to a capless fuel filler system via a spud valve, and may further couple the fuel tank to the capless fuel filler system via a vapor recirculation line, as depicted in FIG. 2. The capless fuel filler system may comprise a negative pressure relief valve, described with regard to the capless fuel filler system depicted in FIG. 3. An evaporative level check module (ELCM) may be included in the evaporative emissions control system, in order to apply vacuum on the evaporative emissions control system and fuel system for conducting evaporative emissions test diagnostics and to indicate the functionality of the negative pressure relief valve and indicate whether the fuel system vapor recirculation line is restricted. Accordingly, the ELCM may be configured to adapt various conformations, such as the conformations shown in FIGS. 4A-4C. A method for indicating the functionality of the negative pressure relief valve in the capless fuel filler system is illustrated in FIG. 5. Responsive to an indication that the negative pressure relief valve is functional, it may be determined whether or not the fuel system vapor recirculation line is restricted, according to the method illustrated in FIG. 6. An example timeline for determining whether the vapor recirculation line is restricted, subsequent to an indication that the negative pressure relief valve is functional, is depicted in FIG. 7.

Figure 1:
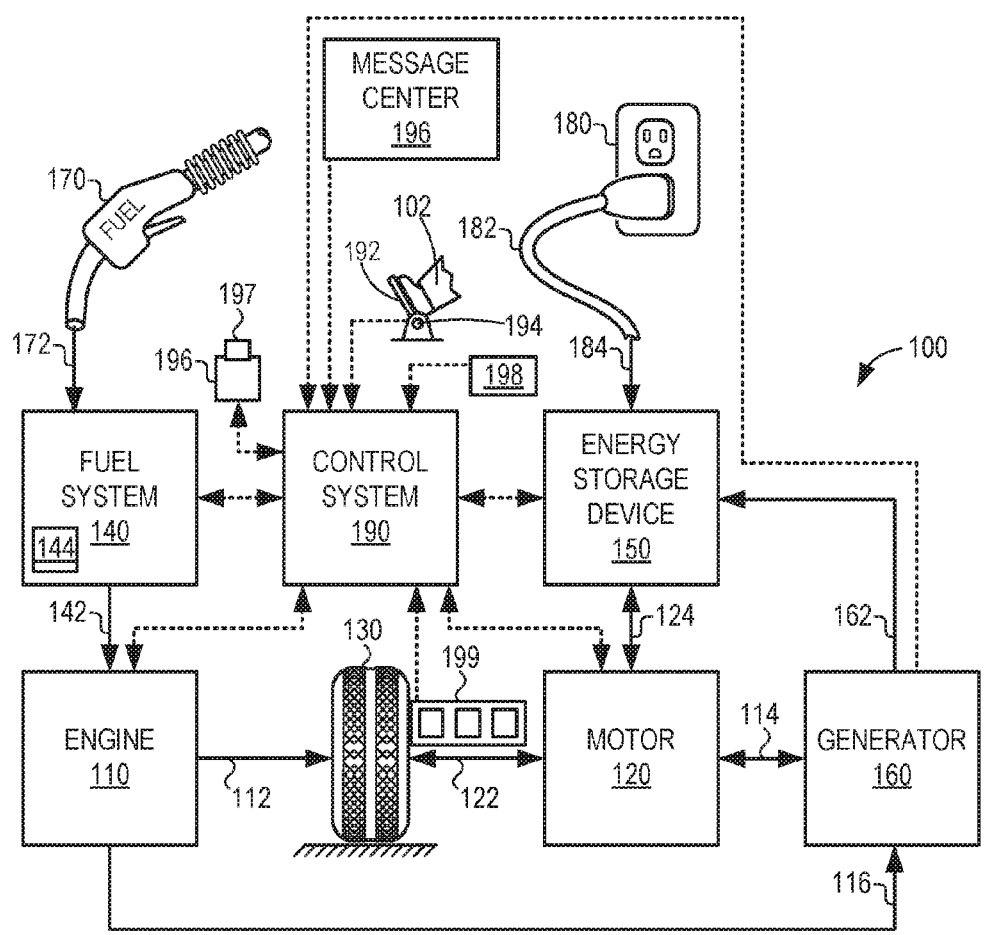
FIG. 1 schematically shows an example vehicle propulsion system.
Figure 2:
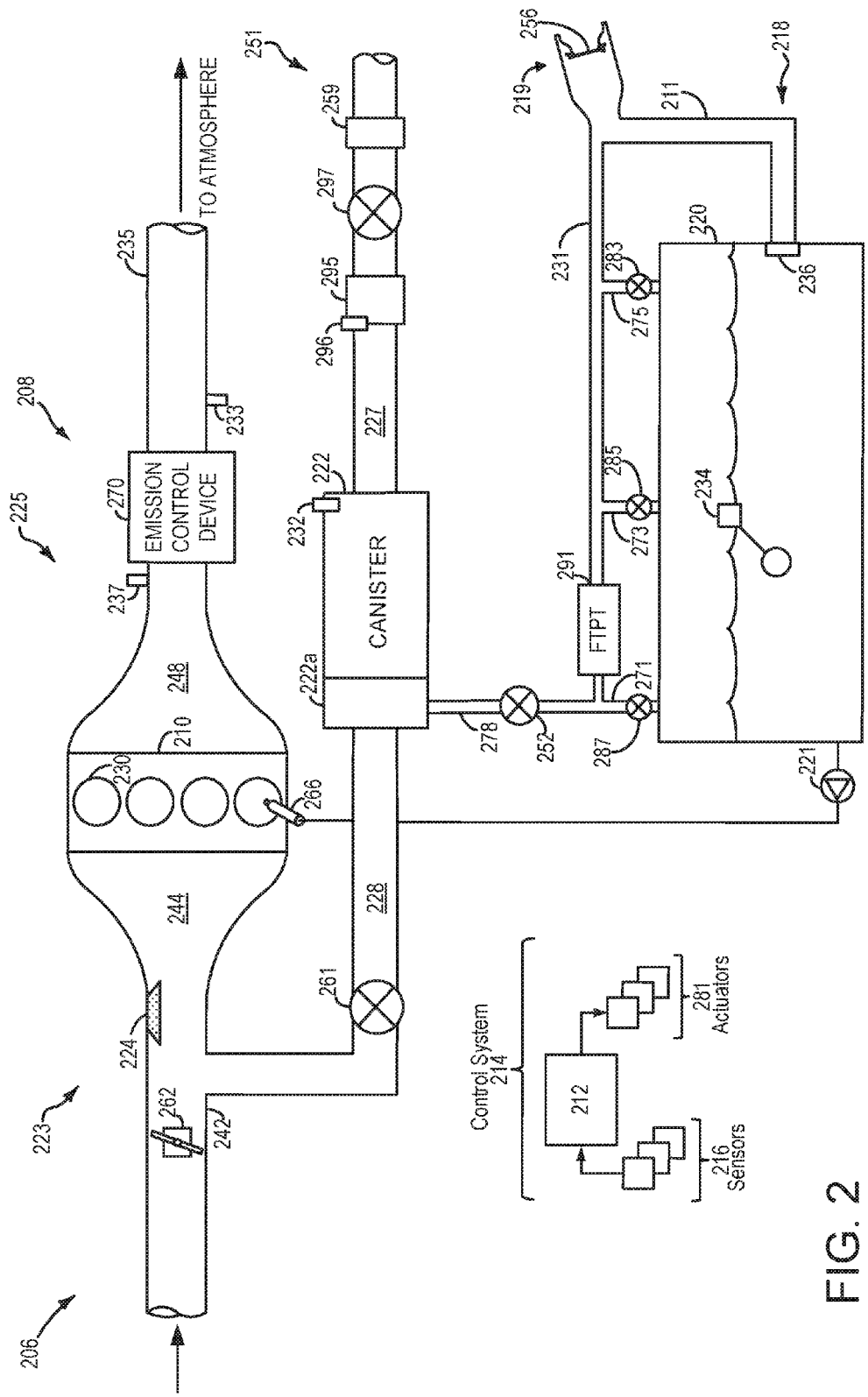
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated.

During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198. Vehicle propulsion system 100 may also include inertial sensors 199. Inertial sensors 199 may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an evaporative emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from one or more fuel injectors with undesired fuel outflow, and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors may be passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251 which includes a fuel vapor canister 222 via vapor recirculation line 231, before being purged to the engine intake 223. Vapor recirculation line 231 may be coupled to fuel tank 220 via one or more conduits and may include one or more valves for isolating the fuel tank during certain conditions. For example, vapor recirculation line 231 may be coupled to fuel tank 220 via one or more or a combination of conduits 271, 273, and 275.

Further, in some examples, one or more fuel tank vent valves may be configured in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, vapor recirculation line 231 may be coupled to a fuel filler system, for example capless fuel filler system 219. As described above, vapor recirculation line 231 may be configured to circulate and/or hold a percentage of refueling vapors, thus limiting the rate of fuel vapor canister loading. Fuel vapors may recirculate back to the fuel tank by flowing through the vapor recirculation line 231, and then through a filler pipe or neck 211, depicted herein as coupled to the capless fuel filler system 219. Furthermore, the vapor recirculation line may provide a path to the fuel filler neck in order to conduct diagnostic tests for undesired evaporative emissions from filler neck 211 and capless fuel filler system 219, particularly under conditions wherein the fuel level is above a fuel filler neck spud valve 236, as will be described in further detail below.

The capless fuel filler system may include a negative pressure relief valve 256 which remains closed to seal off the fuel system without a cap. For example, pressure relief valve 256 may be opened by inserting a fuel nozzle, such as a nozzle of fuel dispensing device (e.g., 170 in FIG. 1), into the fuel filler neck for refueling. Negative pressure relief valve 256 may release pressure in the fuel system at a preset negative pressure to prevent too large a negative pressure forming in the fuel vapor recovery system or fuel tank. As such, negative pressure relief valve 256 may be vacuum-actuated, wherein the negative pressure relief valve is configured to open at a preset negative pressure or vacuum. In hybrid electric or plug-in hybrid applications, under some driving conditions the internal combustion engine, and vapor purging, may not operate for a long period of time thus hydrocarbons may therefore be more likely to form in the pressure relief valve causing it to stick, e.g., due to stiction, and not release at the preset negative pressure. It is therefore important that the negative pressure relief valve 256 be routinely checked for proper functioning, as will be described in further detail below and with regard to the method depicted in FIG. 5.

In some examples, capless fuel filler system 219 may include a mis-fueling inhibitor (not shown) which may be sized to prevent incorrectly-sized fuel nozzles or spouts from opening the valve 128 in the capless fuel filler neck in order to reduce occurrences of mis-fueling. For example, in a diesel engine, a mis-fueling inhibitor may be configured to permit a standard-sized diesel fuel nozzle to open the capless filler neck and prevent a petrol fuel nozzle, which may be smaller than a diesel fuel nozzle, from opening the capless filler neck. As another example, in a petrol engine, a mis-fueling inhibitor may be configured to permit a standard-sized petrol fuel nozzle to open the capless filler neck and prevent a diesel fuel nozzle from opening the capless filler neck.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within load conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

In still another example, the controller 212 may open canister purge valve 261 and canister vent valve 229 while opening isolation valve 252 so that fuel vapors from fuel tank 220, in addition to desorbed fuel vapors from canister 222, are both purged into the engine air intake to be combusted in the engine.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 232. Exhaust gas sensor 237 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Other sensors such as pressure, temperature, and composition sensors may be coupled to various locations in the vehicle system 206. As another example, the actuators may include fuel injector 266, throttle 262, fuel tank isolation valve 252, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 5-6.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Evaporative emissions detection routines may be intermittently performed by controller 212 on fuel system 218 to confirm that an undesired amount of evaporative emissions are not being released from the fuel system and/or evaporative emissions control system. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. Evaporative emissions tests may be performed by an evaporative level check module (ELCM) 295 communicatively coupled to controller 212. ELCM 295 may be coupled in vent line 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. For example, a pump in the module may evacuate a small volume of air from the emission control system through a reference orifice in the module to obtain a reference pressure. The pump may then be operated to generate decreasing pressure in the emission control system which may be monitored by a controller and undesired evaporative emissions may be indicated in response to the pressure in the emission control system remaining above an adjusted reference pressure, where the adjusted reference pressure is based on an actual size or diameter of the reference orifice in the ELCM.

As described above, entire evaporative emissions control systems and fuel systems need to be intermittently diagnosed for the presence of undesired evaporative emissions. Under conditions wherein a fuel level is below the level of the spud valve 236, evacuating the fuel tank may direct vacuum through the spud valve to the fuel filler neck 211 and to the negative pressure relief valve 256 configured in the capless fuel filler system 219. Under such conditions, the fuel filler neck and capless fuel filler system may be adequately checked for undesired emissions. However, in an example situation wherein the fuel level is above the spud valve 236, the only path to the fuel filler neck 211 and capless fuel filler system 219 is via the vapor recirculation line 231. If the vapor recirculation line 231 is blocked or restricted, the capless fuel filler system 219 and fuel filler neck may not be accessible to applied vacuum, thus any undesired evaporative emissions in these areas may go undiagnosed. As such, indicating whether the vehicle's fuel system vapor recirculation line is restricted may allow mitigating actions to be taken thereby avoiding undesired evaporative emissions going undetected in the capless fuel filler system and fuel filler neck.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3:
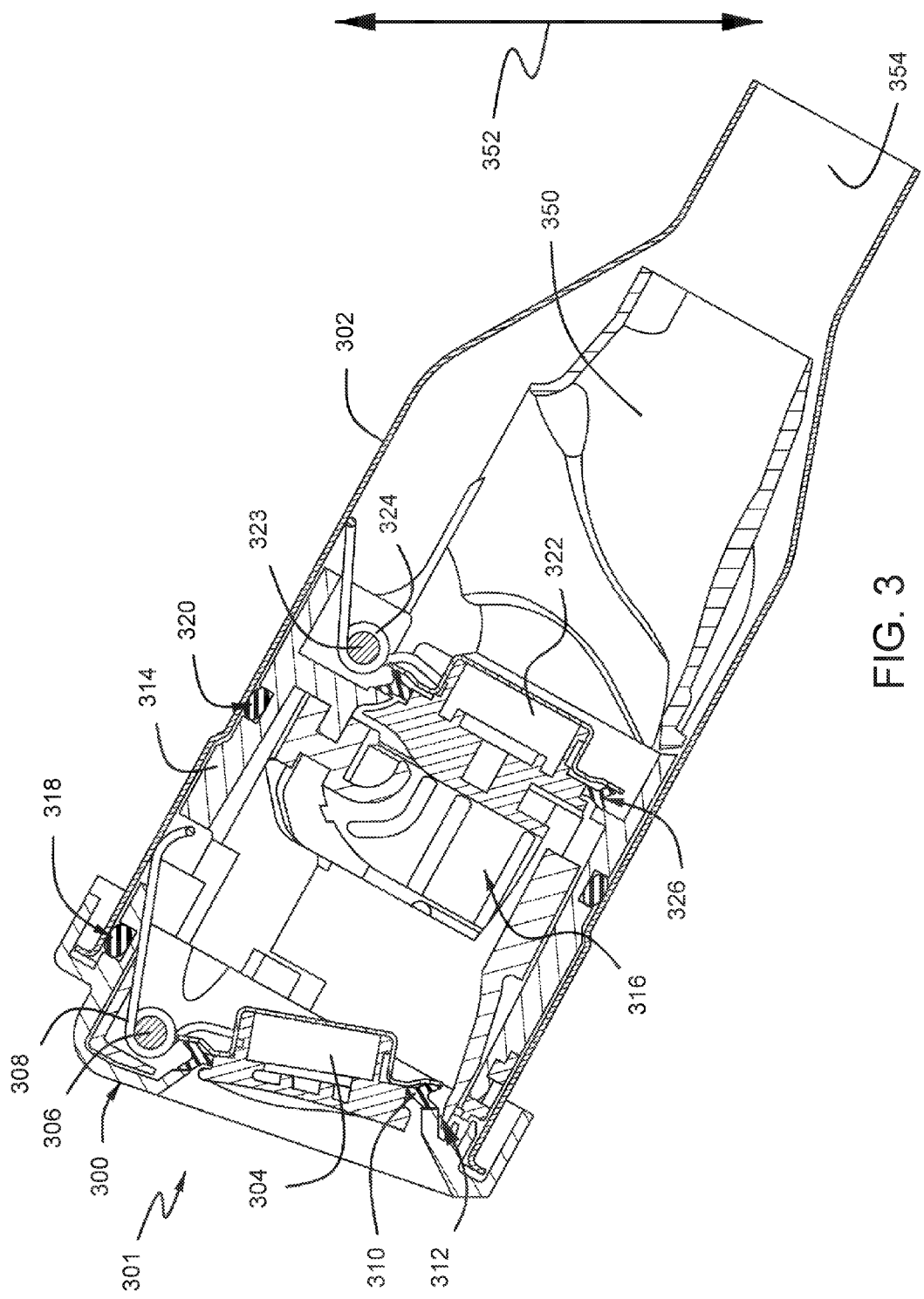
FIG. 3 shows an illustration of a capless refueling assembly for the fuel system of FIG. 2.

FIG. 3 shows a refueling assembly (capless fuel filler system) 301. The refueling assembly 301 includes a cover 300. The cover 300 is configured to enclose components in the assembly. The refueling assembly further includes an external housing 302 configured to at least partially enclose various internal components of the refueling assembly 301. The refueling assembly 301 further includes an upstream door 304 having a hinge 306. The upstream door 304 is inset from the cover 300. A preloaded upstream spring 308 may be coupled to the upstream door 304 and the external housing 302. The preloaded upstream spring 308 may be coupled to the upstream door 304 providing a return force to the door when opened. The upstream spring 308 may be configured to provide a return force when the upstream door 304 is depressed via a fuel nozzle. In this way, the upstream door 304 may close after a fuel nozzle is removed during a refueling event. Thus, the upstream door 304 automatically closes without assistance from a refueling operator. As a result, the refueling process may be simplified.

A seal 310 may be attached to the upstream door 304. Specifically, the seal 310 may extend around the periphery of the upstream door 304, in some examples. When the upstream door 304 is in a closed position the seal may be in face sharing contact with the cover 300. In this way, the evaporative emissions from the refueling assembly 301 are reduced.

The refueling assembly 301 may further include locking lip 312. The locking lip 312 may be configured to receive a portion of a fuel nozzle. In some examples, the locking lip 312 may be provided around at least 100° of the inside circumference of the refueling assembly 301. The locking lip 312 may influence the positioning and angle of the fuel nozzle axis spout during refueling and therefore has an impact on filling performance.

The refueling assembly 301 further includes an internal housing 314. The walls of the internal housing 314 may define a nozzle enclosure configured to receive a fuel nozzle. The internal housing 314 may also include a nozzle stop actuator 316 configured to actuate a portion of the fuel nozzle that initiate fuel flow from the fuel nozzle.

An upstream body seal 318 and a downstream body seal 320 may be provided in the refueling assembly 301 to seal the external housing 302 and various internal components in the refueling assembly 301. Specifically, the upstream and downstream body seals (318 and 320) are configured to extend between the external housing 302 and the internal housing 314. The upstream body seal 318 and/or downstream body seal 320 may be an O-ring in some examples.

The refueling assembly 301 may further include a downstream door 322 positioned downstream of the upstream door 304 and the nozzle stop actuator 316. The downstream door 322 includes a hinge 323 and has a preloaded downstream spring 324 coupled thereto. The preloaded downstream spring 324 is coupled to the downstream door 322 providing a return force to the downstream door 322 when opened. The downstream spring 324 is also coupled to the external housing 302. The spring 324 is configured to provide a return force to the downstream door 322 when the downstream door 322 is in an open position. The downstream door 322 may also include a seal 326 (e.g., flap seal). The seal 326 may be positioned around the periphery of the downstream door 322, in some examples. The downstream door 322 enables the evaporative emissions during the refueling process to be further reduced. The downstream door 322 is arranged perpendicular to the fuel flow when closed, in the depicted example. However, other orientations of the downstream door 322 are possible.

Refueling assembly 301 may be positioned in a number of configurations in the vehicle 100, shown in FIG. 1. In one example, refueling assembly 301 has a downward gradient. In other words, upstream door 304 is positioned vertically above flow guide 350 with regard to gravitational axis 352. In this way, fuel flow is assisted via gravity during refueling operation.

Refueling assembly 301 includes flow guide 350 which is arranged downstream of downstream door 322. Refueling assembly 301 further includes fuel filler pipe (neck) 354. Flow guide 350 may be at least partially enclosed by fuel filler neck 354. Fuel filler neck 354 is in fluidic communication with fuel tank (e.g., 220 as shown in FIG. 2).

Refueling assembly 301 may further include a vacuum relief mechanism. The vacuum relief mechanism may allow a passage in refueling assembly 301 to open under a threshold vacuum, allowing for the venting of fuel tank 220 (FIG. 2) to atmosphere. In this way, an excess of fuel tank vacuum will cause the vacuum relief mechanism to vent to atmosphere, preventing the fuel tank from collapsing. The vacuum threshold for activating the vacuum relief mechanism may be set at −20 inH2O, for example, or at a suitable threshold depending on the fuel tank design and configuration. The vacuum threshold may also be set at a level greater than vacuum conditions typically used for fuel system evaporative emissions testing using vacuum applied via ELCM (e.g., 295 in FIG. 2). For example, the vacuum threshold may be set above −12 $inH_2O$, for example, or at a suitable level depending on the configuration of ELCM 295 as described further herein and with regards to FIGS. 4A-C. In this way, an ELCM testing cycle may not trigger the vacuum relief mechanism (which may cause a false fail result), but such that naturally occurring tank vacuum above a threshold, or an applied vacuum above the threshold for triggering the vacuum relief mechanism, may be relieved. In some embodiments, the vacuum relief mechanism may comprise preloaded upstream spring 308 and preloaded downstream spring 324 set with a tension such that fuel tank vacuum above a threshold (e.g., −20 $InH_2O$) may cause upstream door 304 and downstream door 322 to open, thereby venting fuel tank (e.g., 220) to atmosphere. In another example (not shown), the vacuum relief passage may not comprise upstream door 304 or downstream door 322, but rather a separate vacuum-actuated valve may be configured within refueling assembly 301, such that the valve may be opened under a threshold vacuum, allowing for the venting of fuel tank (e.g., 220) to atmosphere. In still other examples, preloaded upstream spring 308 and preloaded downstream spring 324 may be solenoid activated springs under control of controller 212 (FIG. 2). When fuel tank vacuum increases above the threshold vacuum (as determined by fuel tank pressure sensor 291 in FIG. 2, for example) controller 212 may deactivate the solenoids, allowing for upstream door 304 and downstream door 322 to open, venting fuel tank 220 to atmosphere. Upon fuel tank vacuum reaching a threshold level, the solenoids may be re-activated.

Incorporating a capless refueling system may provide numerous benefits to the vehicle and vehicle operator. For example, there is no risk of losing a refueling cap, of improperly replacing the refueling cap following a refueling event, or of stripping the threads of the refueling cap so it cannot form a complete seal. Any of these conditions may lead to an increase in evaporative emissions from the fuel tank, and may further prevent the vehicle from properly performing evaporative emissions test diagnostics. The capless refueling system, such as the refueling assembly described herein with regard to FIG. 3 and with further regard to FIG. 2 presents one solution to these problems. However, as described above, undesired evaporative emissions may still go undiagnosed if during evacuation of an evaporative emissions control system and fuel system, the fuel level is greater than the level of a fuel tank spud valve (e.g., 236), and there is a restriction in the fuel system vapor recirculation line (e.g., 230), thus rendering the capless fuel filler system (e.g., 219, 301) and fuel filler neck (e.g., 211) isolated from applied vacuum. As will be described in further detail below, by indicating a pressure profile during evacuating the evaporative emissions control system and fuel system under conditions wherein the fuel level is both above and below the fuel tank spud valve (e.g., 236), restrictions in the vapor recirculation line (e.g., 230) may be indicated, thereby reducing opportunities for undesired evaporative emissions to go undiagnosed in the capless fuel filler system and fuel filler neck.

Figure 4A:
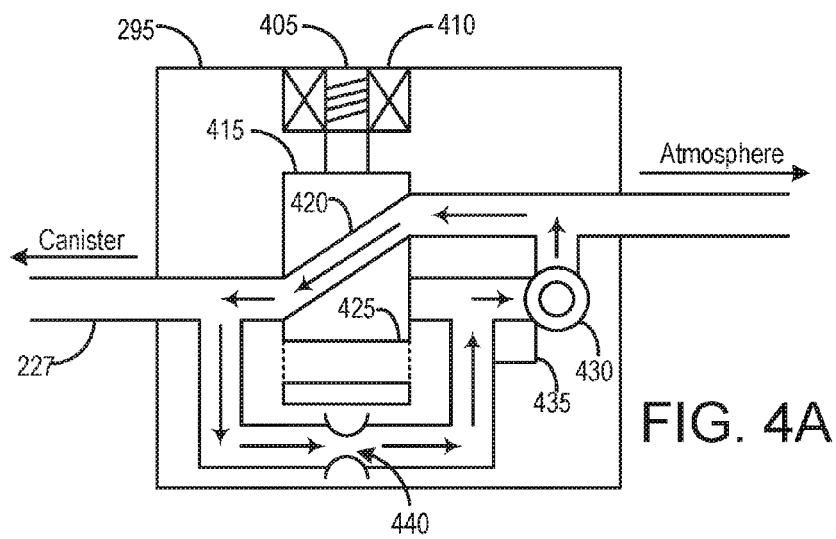
FIG. 4A shows a schematic depiction of an evaporative level check monitor in a configuration to perform a reference check.
Figure 4B:
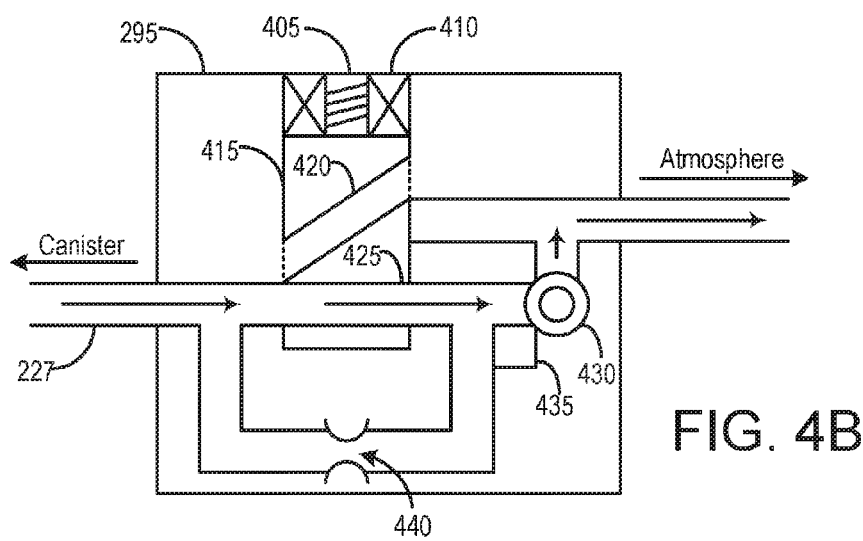
FIG. 4B shows a schematic depiction of an evaporative level check monitor in a configuration to perform an evaporative emissions control system and fuel system evacuation evaporative emissions test diagnostic.
Figure 4C:
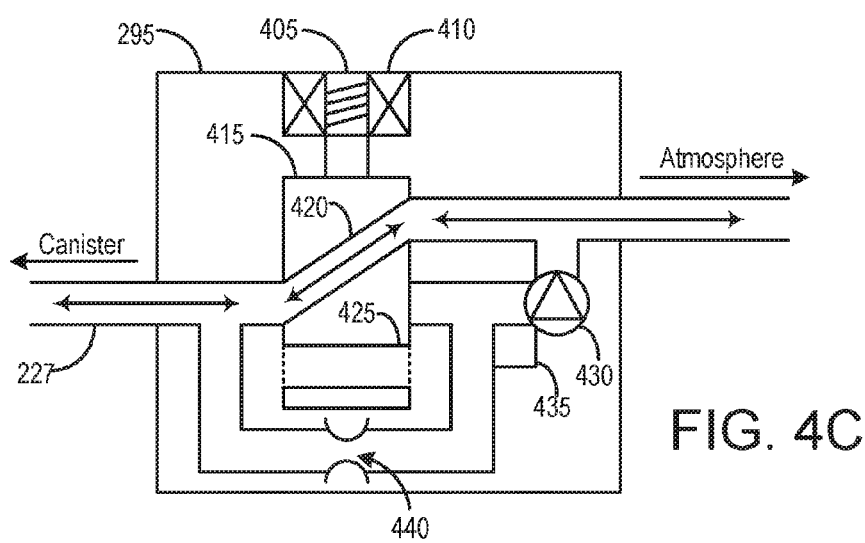
FIG. 4C shows a schematic depiction of an evaporative level check monitor in a configuration to perform a purge operation or to vent the fuel vapor canister to atmosphere.
Figure 5:
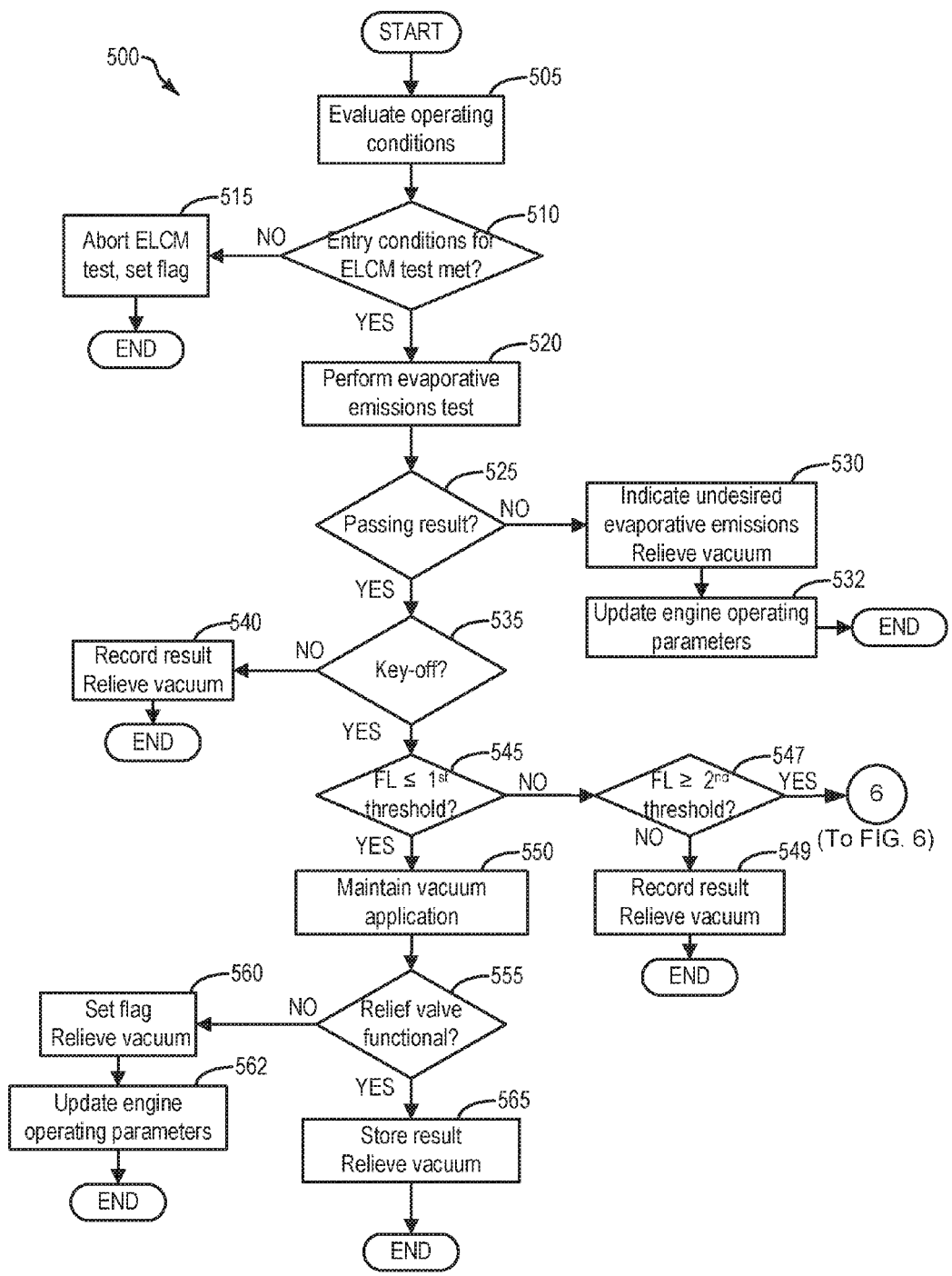
FIG. 5 shows an example method for determining whether a capless refueling assembly as depicted in FIG. 2, is operating reliably.

FIGS. 4A-4C show a schematic depiction of an example ELCM 295 in various conditions in accordance with the present disclosure. As shown in FIG. 2, ELCM may be located along vent line 227 between canister vent valve 297 and atmosphere. ELCM 295 includes a changeover valve (COV) 415, a pump 430, and a pressure sensor 435. Pump 430 may be a vane pump, however other pump configurations have additionally been contemplated. The COV may be moveable between a first a second position. In the first position, as shown in FIGS. 4A and 4C, air may flow through the ELCM via first flow path 420. In the second position, as shown in FIG. 4B, air may flow through the ELCM via second flow path 425. The position of the COV may be controlled by solenoid 410 via compression spring 405. The ELCM may also comprise reference orifice 440. The reference orifice may have a diameter corresponding to the size of a threshold leak to be tested, for example, 0.02". In either the first or second position, pressure sensor 435 may generate a pressure signal reflecting the pressure within the ELCM. Operation of the COV and solenoid may be controlled via signals received from controller 212.

As shown in FIG. 4A, the COV is in the first position, and the pump is activated. Air flow through the ELCM in this configuration is represented by arrows. In this configuration, the pump may draw a vacuum on the reference orifice, and the pressure sensor may record the vacuum level within the ELCM. This reference check vacuum level reading may then become the threshold for passing/failing a subsequent evaporative emissions test.

As shown in FIG. 4B, COV (e.g. 415) is in the second position, and pump (e.g., 430) is activated. Canister vent valve (not shown) is open, allowing the pump to draw a vacuum on fuel system (e.g., 218). In examples where the fuel system includes a FTIV (e.g., 252), the FTIV may be opened to allow the pump (e.g., 430) to draw a vacuum on the fuel tank (e.g., 220). Air flow through ELCM in this configuration is represented by arrows. In this configuration, as the pump pulls a vacuum on evaporative emissions control system (e.g., 251) and fuel system (e.g., 218), the absence of undesired evaporative emissions in the system may allow for the vacuum level in the ELCM to reach or exceed the previously determined vacuum threshold. In the presence of undesired evaporative emissions larger than the reference orifice, the pump may not pull down to the reference check vacuum level.

As shown in FIG. 4C, COV (e.g. 415) is in the first position, and pump (e.g., 430) is de-activated. Canister vent valve (not shown) is open, allowing for air to freely flow between atmosphere and the canister, such as during a canister purging operation wherein canister purge valve (e.g., 261) is open and intake manifold vacuum may draw air through the ELCM and fuel vapor canister (e.g., 222), thus resulting in the desorption of fuel vapors to engine intake for combustion. In another example, the COV may be configured in the first position with the pump deactivated and canister vent valve (e.g., 297) opened during a refueling event. If equipped, a FTIV (e.g., 252) may additionally be commanded open and refueling vapors may thus be routed from the fuel tank to the fuel vapor canister to be adsorbed, prior to exiting to atmosphere via the ELCM and open canister vent valve.

As discussed above, during evacuating the evaporative emissions control system (e.g., 251) and fuel system (e.g., 218) with the ELCM (or alternative vacuum source such as engine intake manifold vacuum) in order to conduct an evaporative emissions test diagnostic, if any region of the evaporative emissions system or fuel system has become isolated from the applied vacuum, undesired evaporative emissions may go undetected. Accordingly, verifying that there are no restrictions that may lead to regions of the evaporative emissions control system and/or fuel system becoming isolated may serve to reduce circumstances wherein undesired evaporative emissions go undiagnosed. As one example, described in detail below, the negative pressure relief valve (e.g., 256) in the capless fuel filler system (e.g., 219) may be used to diagnose potential restrictions in the fuel system vapor recirculation line (e.g., 231). However, in order to utilize the negative pressure relief valve for diagnosis, it must first be indicated that the negative pressure relief valve is functioning as intended. Subsequent to verification of proper functioning of the negative pressure relief valve, analysis of potential restrictions in the vapor recirculation line may be conducted.

Turning now to FIG. 5, a flow chart for a high level example method 500 for indicating an operational state of a pressure relief valve (e.g., 256) in a capless fuel filler system (e.g., 219, 301) is shown. More specifically, method 500 may be used to indicate whether a fuel level in a fuel tank is below a fuel tank spud valve (e.g., 236), subsequent to evacuating an evaporative emissions control system and fuel system to perform an evaporative emissions diagnostic test. If the fuel level is below the spud valve, the fuel system may be continued to be evacuated until the negative pressure relief valve is opened. In this way, the operational state of the negative pressure relief valve in the capless fuel filler system may be determined subsequent to evacuating the fuel system to conduct an evaporative emissions test, thus making use of the vacuum generated for the evaporative emissions test to verify function of the negative pressure relief valve. Method 500 will be described with reference to the systems described herein and shown in FIGS. 1-4C, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators such as the FTIV (e.g., 252) to fluidically couple the fuel tank to the evaporative emissions system, and the ELCM pump (e.g. 430) to apply vacuum on the evaporative emissions system and fuel system, according to the methods described below.

Method 500 begins at 505 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 510, method 500 may include determining whether entry conditions for an ELCM evaporative emissions test are met. Entry conditions for an ELCM evaporative emissions test may include an engine-off status, or an engine-on status wherein it is indicated that a purge operation is not occurring. Entry conditions may further include a duration of time since a previous ELCM evaporative emissions test was conducted. If entry conditions are not met, method 500 may proceed to 515. At 515, method 500 may include recording that an ELCM evaporative emissions test was not conducted, and may further include setting a flag to retry the ELCM test at a later time point. Method 500 may then end.

Returning to 510, if entry conditions for an ELCM test are met, method 500 may proceed to 520. At 520, method 500 may include performing an ELCM evaporative emissions test. For example, at 520 an ELCM reference check may first be performed. As discussed herein with regard to FIG. 4A, an ELCM reference check may comprise placing or maintaining a COV (e.g., 415) in a first position, and activating an ELCM vacuum pump (e.g., 430). A pressure sensor (e.g., 435) may record the resulting vacuum level in the ELCM after a certain amount of time, or when the vacuum level has reached a plateau. The recorded vacuum level at the end of the reference check may be used as the reference vacuum level during conducting of the ELCM evaporative emissions test on the evaporative emissions system and fuel system, based on the reference orifice utilized for the reference check. In one example, the reference orifice may comprise a diameter of 0.02", but may be smaller or greater in diameter in other examples. For example, if a reference orifice of 0.02" is used for the reference check and a corresponding vacuum level is attained during the reference check, then during testing of the evaporative emissions control system and fuel system, if the vacuum level does not reach the vacuum level attained during the reference check, then it may be indicated that undesired evaporative emissions are escaping from an orifice greater than 0.02".

Subsequent to performing the reference test, if included, a FTIV (e.g., 252) may be commanded open, the canister vent valve may be commanded (or maintained) open, the COV 415 may be placed in the second position (solenoid 410 energized), and pump 430 may be activated. In this configuration, as pump 430 pulls a vacuum on the evaporative emissions control system and the fuel system, an absence of undesired evaporative emissions may allow for the vacuum level to reach or exceed the previously determined reference vacuum threshold. If, however, undesired evaporative emissions are escaping from an orifice diameter greater than that of the reference orifice, the pump will not pull down to the reference check vacuum level. The evacuation of the evaporative emissions control system and the fuel system may be executed until the reference vacuum is attained, for a predetermined time period, or for a time period based on current conditions.

Continuing at 525, method 500 may include determining whether the vacuum level attained during the ELCM evaporative emissions test is greater than or equal to the reference vacuum threshold attained during the reference check. If undesired emissions are detected (e.g., the vacuum did not reach the reference vacuum threshold during the evaporative emissions test), method 500 may proceed to 530. At 530, indicating undesired evaporative emissions may include recording at the controller that the reference vacuum level was not attained during the ELCM evaporative emissions test, and may further include illuminating a malfunction indicator light (MIL). Furthermore, at 530, method 500 may include de-activating pump 430 and de-energizing solenoid 410 (COV in the first position) to relieve the applied vacuum. Following relieving the applied vacuum, in some examples the canister vent valve may be commanded closed, however in other examples the canister vent valve may be maintained open. Furthermore, if included, the FTIV may be commanded closed. Method 500 may then proceed to 532 and may include updating engine operating parameters. In one example, a canister purge schedule may be updated to include information about the undesired evaporative emissions. For example, to reduce the amount of undesired evaporative emissions released to atmosphere, purging operations may be scheduled to be performed more frequently. Furthermore, purge operations (with the CPV open) may be performed with both the FTIV and the CVV open, to purge fuel vapors from both the canister and the fuel tank to engine intake. In other examples, at 532, updating engine operating parameters may include directing fuel tank vapors to the fuel vapor canister to be stored more frequently. For example, pressure in the fuel tank may be monitored, and responsive to an indication of fuel tank pressure greater than a threshold, the FTIV may be commanded open (with the CVV open), such that fuel tank vapors may be directed to the fuel vapor canister to be stored, reducing the amount of fuel vapors that may be released to the environment. In still another example, the ELCM may be scheduled to be used to further isolate a potential location of the undesired evaporative emissions. For example, an ELCM evaporative emissions test may be performed with the FTIV in a closed conformation. Responsive to an indication of an absence of undesired emissions, it may be determined that the location of undesired evaporative emissions stems from the fuel system. Method 500 may then end.

Returning to 525, if undesired emissions are not detected (e.g., the vacuum during the evaporative emissions test reached or exceeded the reference check vacuum level), method 500 may proceed to 535. At 535, method 500 may include determining whether a key-off event is indicated, or whether the vehicle is in operation. For example, a key-off event may indicate that the engine is off, and that the vehicle is not being propelled by battery power. In other words, a key-off event may comprise the vehicle being parked, wherein the parking event is not simply due to the vehicle stopping at a stop-light, for example, wherein the engine may (e.g., start-stop vehicle), or may not, be deactivated. If a key-off event is not indicated, driving conditions may result in significant displacement of fuel in the fuel tank (e.g., incline, acceleration/deceleration, etc.), such that results from diagnostic tests for negative pressure relief valve and/or recirculation line orifice functionality, both of which rely on knowledge of fuel level in the fuel tank respective to the spud valve (e.g., 236) (described in further detail below), may not be robust. For example, driving conditions may render an accurate determination of whether fuel level is above or below the spud valve unreliable. As such, if a key-off event is not indicated, method 500 may proceed to 540. At 540, method 500 may include recording the passing result of the ELCM. The passing result may be stored at the controller, and an ELCM evaporative emissions test schedule may be updated to reflect the passing result. Furthermore, at 540, method 500 may include de-activating pump 430 and de-energizing solenoid 410 to relieve the applied vacuum. In some examples the canister vent valve may be commanded closed, however in other examples the canister vent valve may be maintained open. Furthermore, if included, the FTIV may be commanded closed. Method 500 may then end.

Returning to 535, if a key-off event is indicated, the passing result of the ELCM test may be stored at the controller, an ELCM evaporative emissions test schedule may be updated to reflect the passing result, and method 500 may proceed to 545. At 545, method 500 may include determining whether the level of fuel in the fuel tank is at or below a first fuel level threshold. For example, the first threshold may comprise a fuel level a predetermined distance below the level of the spud valve (e.g., 236). The level of fuel stored in the fuel tank may be determined by a fuel level sensor, such as fuel level sensor 234. Fuel level sensor may comprise a float connected to a variable resistor, as depicted in FIG. 2. Alternatively, other types of fuel sensors may be used, such as non-contact ultrasonic or radar fuel level sensors. As fuel tank geometry and spud valve placement position determines where the fuel level is in relation to the spud valve in the fuel tank, determining whether the level of fuel in the fuel tank is at or below the first threshold may be based on a combination of fuel level and computer assisted drawing (CAD) modeling of the fuel tank, such that an accurate assessment of whether the fuel level is at or below the first threshold may be determined based on the level of fuel indicated to be stored in the fuel tank. Furthermore, as alluded to above, in some conditions the surface on which the vehicle is parked may additionally contribute to the fuel level being above or below the spud valve. For instance, if the vehicle is parked on an incline, fuel may be displaced within the fuel tank such that the spud valve is below the fuel level, while alternatively if parked on a flat surface the spud valve may be above the fuel level. Opposite scenarios are possible as well. For example, the spud valve may be below the fuel level when parked on a flat surface, but in certain parking conditions with the same level of fuel in the tank, the spud valve may be above the fuel level. Thus, at 545, determining whether the fuel level is at or below the first threshold may further be based on the vehicle parking condition. Information on the vehicle parking condition may be acquired from inertial sensors (e.g., 199), and combined with fuel level and CAD modeling of the vehicle's fuel tank. As such, it may be determined whether the fuel level is at or below the first threshold, for any given parking condition. If, at 545, it is indicated that the fuel level is not at or below the first threshold, method 500 may proceed to 547. At 547, method 500 may include indicating whether the level of fuel in the fuel tank is at or below a second threshold fuel level. For example, the second threshold may comprise a fuel level a predetermined distance above the level of the spud valve (e.g., 236). As described above, the fuel level may be determined by a fuel level sensor, CAD modeling of the fuel tank, and information on the vehicle parking condition acquired from inertial sensors (e.g., 199). If, at 547, it is indicated that the fuel level is above the second threshold, method 500 may proceed to FIG. 6 where it may be determined whether the fuel system vapor recirculation line is restricted according to the method depicted therein. Alternatively, if it is indicated at 547 that the fuel level is not above the second threshold, method 500 may proceed to 549.

At 549, method 500 may include recording the passing result of the ELCM evaporative emissions test. The passing result may be stored at the controller, and an ELCM evaporative emissions test schedule may be updated to reflect the passing result. Furthermore, at 549, method 500 may include de-activating the pump (e.g., 430) and de-energizing the solenoid (e.g., 410) to relieve the applied vacuum. In some examples the canister vent valve may be commanded closed, however in other examples the canister vent valve may be maintained open. Furthermore, if included, the FTIV may be commanded closed. At 549, recording the passing result and relieving the applied vacuum may be carried out due to the fuel level being within a range wherein the spud valve may be partially submerged to varying extents, thus rendering a diagnostic that relies on a fuel level being distinctly above or below the spud valve unreliable. As such, subsequent to recording the passing result of the ELCM evaporative emissions test and relieving the applied vacuum, method 500 may end.

Returning to 545, if it is indicated that the level of fuel in the fuel tank is at or below the first threshold, method 500 may proceed to 550. At 550, method 500 may include maintaining the ELCM COV in the second position, and maintaining ELCM vacuum pump activation.

Furthermore, the FTIV, if included, may be maintained open, and the canister vent valve may be maintained open. As such, at 550, method 500 includes maintaining evacuating the evaporative emissions system and fuel system until a vacuum greater than or equal to the threshold for activation of the negative pressure relief valve (e.g., 256) configured within the capless fuel filler system is achieved. Because the fuel level is indicated to be below the spud valve, the vacuum may pull predominantly through the fuel filler neck via the spud valve, instead of via the vapor recirculation line, as the route through the fuel filler neck via the spud valve is less restrictive than the vapor recirculation line.

Proceeding to 555, method 500 includes indicating whether the negative pressure relief valve on the capless fuel filler system is functional. As such, at 555, method 500 includes monitoring fuel system pressure via the pressure sensor (e.g., FTPT 291). As vacuum continues to build in the fuel system as a result of maintaining the ELCM vacuum pump activation, a vacuum relief inflection point may be detected by the pressure sensor responsive to the negative pressure relief valve (e.g., 256) on the capless fuel filler system being opened (e.g., vacuum-actuated). In one example, the point at which the negative pressure relief valve opens may be set at −20 InH2O. As such, when the vacuum builds to −20 InH2O, if a vacuum relief inflection point is indicated, it may be assumed that the negative pressure relief valve opened responsive to the vacuum-build to relieve fuel tank pressure, thus protecting the fuel system from an over-vacuum condition. Alternatively, if the negative pressure relief valve is not functional, vacuum may continue to build past the point at which the negative pressure relief valve is designed to open (e.g., −20 InH2O). For example, in hybrid electric or plug-in hybrid electric vehicles, under some driving conditions the internal combustion engine may not operate for a long period of time. Under such conditions, a vapor purge operation may therefore not be performed, and thus hydrocarbon deposits may be likely to form in and around the negative pressure relief valve, causing it to stick, and not release at the preset negative pressure. Accordingly, if negative pressure continues to build past the point at which the negative pressure relief valve is designed to open without an indicated vacuum relief inflection point, it may be indicated that the negative pressure relief valve on the capless fuel filler system is not functional. In one example, it may be indicated that the negative pressure relief valve is not functional responsive to a second predetermined threshold negative pressure being reached. As such, at 555, if it is indicated that the negative pressure relief valve is not functional, method 500 may proceed to 560. At 560, method 500 may include setting a flag at the controller indicating that a negative pressure relief valve test was conducted and that the results of the test indicated that the negative pressure relief valve was not functional. Additionally, at 560, method 500 may include illuminating a malfunction indicator light (MIL) alerting the driver of the need to service the vehicle to mitigate the functional issues with the negative pressure relief valve. Furthermore, at 560, method 500 may include de-activating pump (e.g., 430) and de-energizing solenoid (e.g., 410) to relieve the applied vacuum. Responsive to fuel system pressure reaching a threshold pressure (e.g., atmospheric pressure), the FTIV (if included) may be commanded closed. Additionally, in some examples the canister vent valve may be commanded closed, however in alternate examples the canister vent valve may be maintained open. Proceeding to 562, method 500 may include updating engine operating parameters to include information about the negative pressure relief valve not being functional. For example, fuel tank pressure may be monitored, and responsive to an indication that fuel tank vacuum is greater than a threshold level, the FTIV may be commanded open to relieve fuel tank vacuum. In other examples, applications wherein vacuum is applied to the fuel tank, may be reduced. For example, canister purge operations wherein the FTIV is commanded open to purge fuel vapors from the tank in addition to the fuel vapor canister may be reduced or paused until the negative pressure relief valve is deemed functional. Method 500 may then end.

Returning to 555, if it is indicated that the negative pressure relief valve in the capless fuel filler system is functional, method 500 may proceed to 565. At 565, method 500 may include setting a flag at the controller indicating that a negative pressure relief valve test was conducted and that the results indicated that the negative pressure relief valve was functional. As described above, at 565 method 500 may include de-activating pump 430 and de-energizing solenoid 410 to relieve the applied vacuum. Responsive to fuel system pressure reaching a threshold pressure (e.g., atmospheric pressure), the FTIV (if included) may be commanded closed, and the canister vent valve may be maintained open or commanded closed. Method 500 may then end.

Figure 6:
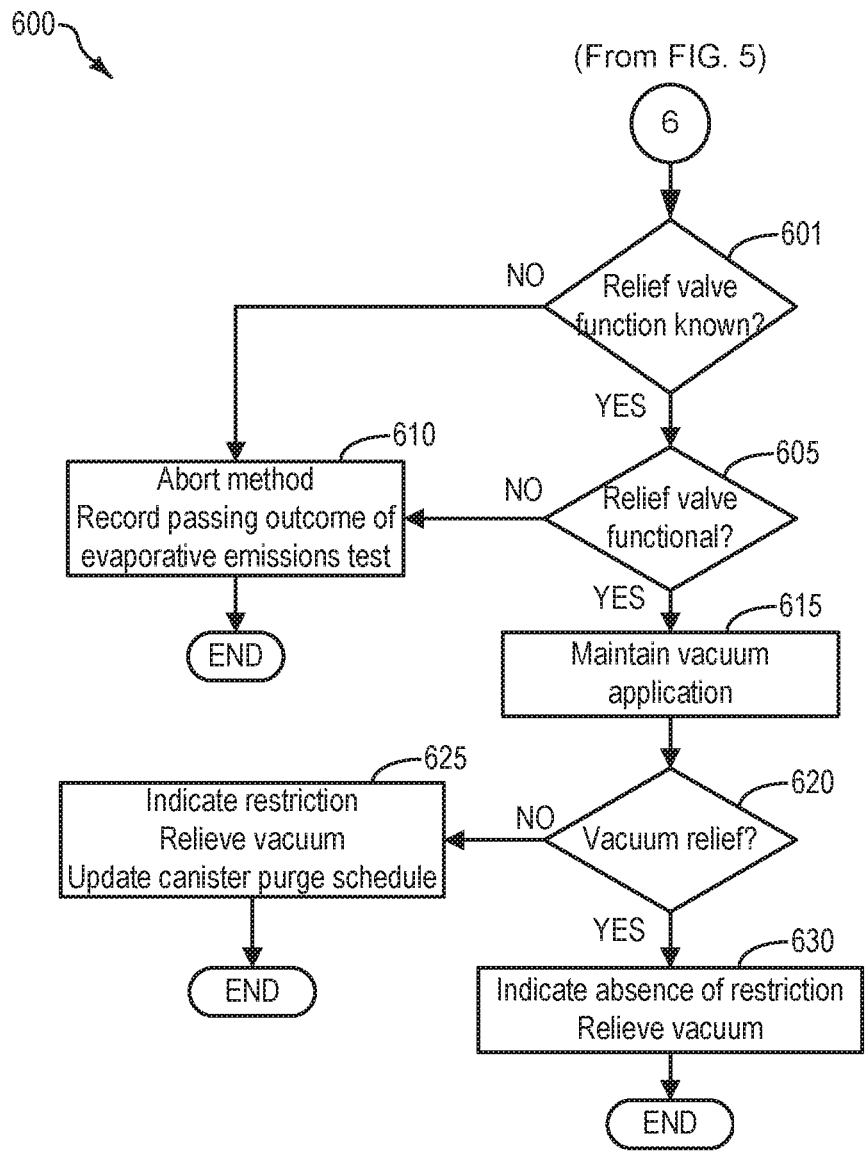
FIG. 6 shows an example method for determining the presence or absence of a restriction in a fuel system vapor recirculation line.
Figure 7:
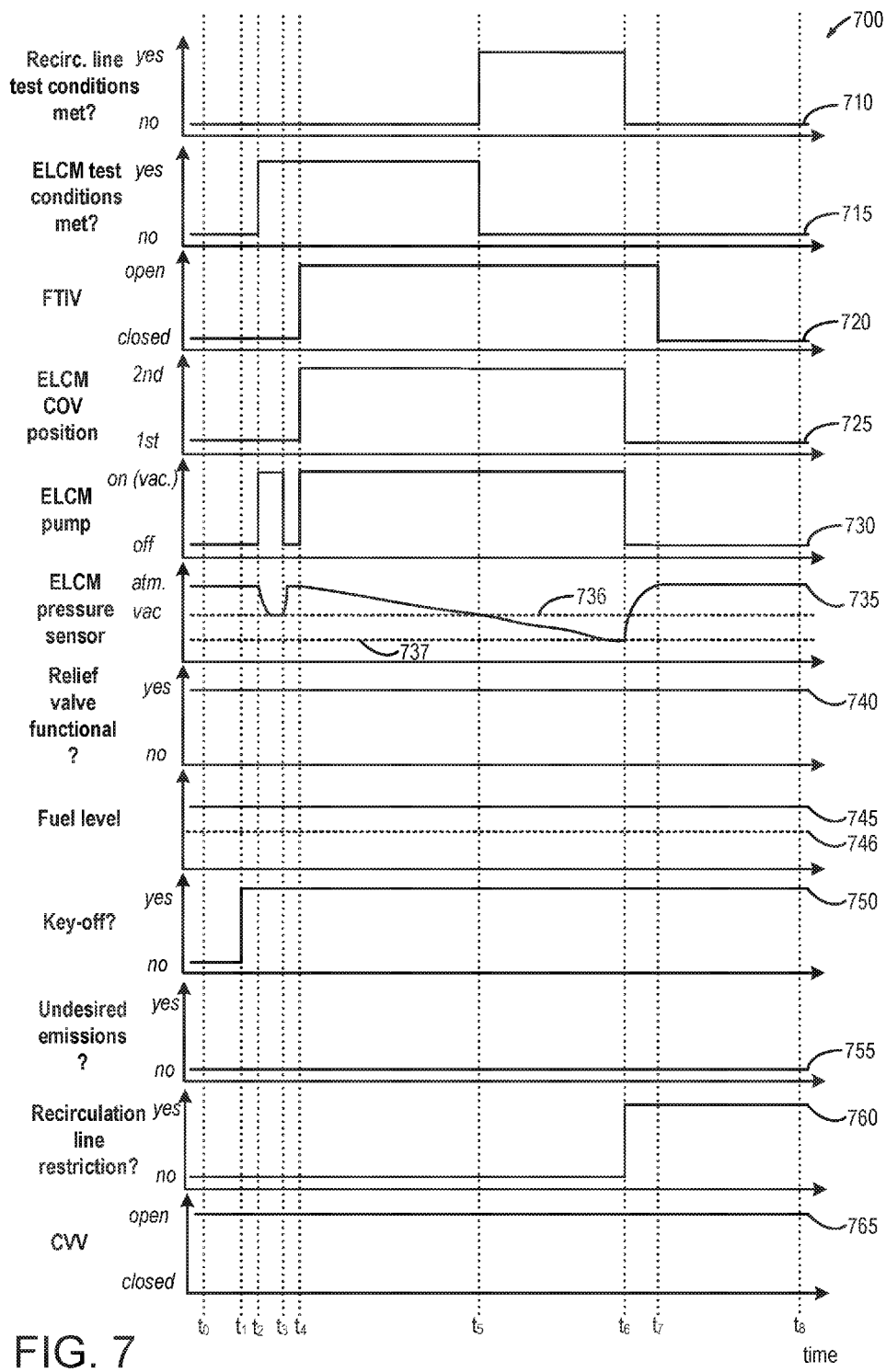
FIG. 7 shows an example timeline for indicating fuel system vapor recirculation line restriction, wherein a negative pressure relief valve has previously been determined to be functional.

A flow chart for a high-level example method 600 for indicating whether a restriction is present in a fuel system vapor recirculation line is shown in FIG. 6. More specifically, method 600 continues from method 500 wherein it was determined that the evaporative emissions control system and fuel system are free from undesired evaporative emissions, that a key-off event is indicated, and that the fuel level in the fuel tank is above the level of a fuel tank spud valve (e.g., 236). As such, method 600 includes indicating whether a negative pressure relief valve (e.g., 256) in a capless fuel filler system (e.g., 219, 301) has been previously indicated to be functional according to the method of FIG. 5, and if so, evacuating the fuel system to a pressure level wherein the negative pressure relief valve is expected to be opened (e.g., vacuum-actuated). As the fuel level is indicated to be above the level of the fuel tank spud valve, the vacuum-evacuation route to the negative pressure relief valve may be understood to be through the vapor recirculation line. Thus, if the negative pressure relief valve is not indicated to be opened responsive to the fuel system evacuation, it may be determined that there is a restriction in the vapor recirculation line. Method 600 will be described with reference to the systems described herein and shown in FIGS. 1-4C, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by a controller based on instructions stored on a memory of the controller and in conjunction with signals received from sensors of the engine system, such as the sensors described above with reference to FIG. 1 and FIG. 2. The controller may employ fuel system and evaporative emissions system actuators such as the FTIV (e.g., 252) to fluidically couple the fuel tank to the evaporative emissions system, and the ELCM pump (e.g., 430) to apply vacuum on the evaporative emissions system and fuel system, according to the methods described below.

Method 600 begins at 601 and includes indicating if it is known whether the negative pressure relief valve in the capless fuel filler system is functional. For example, method 500 may be used to diagnose the operational state of the negative pressure relief valve. In one example, whether the operational state of the relief valve is known may be based on whether a negative pressure relief valve test diagnostic as described by method 500 has been conducted within a predetermined time frame. In other words, if an amount of time has elapsed subsequent to a prior relief valve test diagnostic, it may be determined that it is not known whether the negative pressure relief valve is functional. In other examples, whether the operational state of the relief valve is known may be based on whether a test diagnostic has been conducted and not more than one refueling event has taken place subsequent to the test diagnostic. Other examples may include indicating whether the relief valve is known based on whether a test diagnostic has been conducted and not more than two, or not more than three, refueling events have taken place subsequent to the test diagnostic. In still other examples, if a negative pressure relief valve has been replaced, and the vehicle has been driven for some time with a fuel level above the level of the spud valve as described in FIG. 5, method 500 may not have been previously conducted, and thus whether the relief valve is functional may not be known. As such, if it is indicated that it is not known whether the negative pressure relief valve is functional, method 600 may proceed to 610.

At 610, method 600 may include aborting the method, and recording the passing outcome of the evaporative emissions test conducted as described above with regard to method 500. Briefly, at 610 it may be indicated that undesired emissions were not detected during the evaporative emissions test, based on the test vacuum level reaching the reference vacuum threshold attained during the reference check. Accordingly, at 610, method 600 may include recording the passing result of the ELCM evaporative emissions test at the controller, and an ELCM evaporative emissions test schedule may be updated to reflect the passing result. A flag may additionally be set at the controller indicating that a vapor recirculation test was not conducted, and that the test should be re-attempted responsive to an indication that the function of the negative pressure relief valve is known. Furthermore, at 610, method 600 may include de-activating pump (e.g., 430) and de-energizing the solenoid (e.g., 410) (configuring the ELCM COV in the first position to relieve fuel system vacuum). Responsive to fuel system pressure reaching a threshold pressure (e.g., atmospheric pressure), the FTIV (if included) may be commanded closed, and the canister vent valve may be maintained open or commanded closed. Method 600 may then end.

Returning to 601, if it is indicated that the functional state of the negative pressure relief valve is known, method 600 may proceed to 605. At 605, method 600 may include indicating whether the negative pressure relief valve in the capless fuel filler system is functional. For example, as described above, method 500 may be used to indicate whether the negative pressure relief valve in the capless fuel filler system is functional. As such, at 605, method 600 may include retrieving stored results from the negative pressure relief valve test described in method 500. If it is indicated that the negative pressure relief valve is not functional, method 600 may proceed to 610. At 610, method 600 may include aborting the method, and recording the passing outcome of the evaporative emissions test conducted as described above. A flag may additionally be set at the controller indicating that a vapor recirculation test was not conducted, and that the test should be re-attempted responsive to an indication that the negative pressure relief valve is functional. Furthermore, the pump (e.g., 430) may be de-activated and the solenoid (e.g., 410) de-energized (configuring the ELCM COV in the first position to relieve fuel system vacuum). Responsive to fuel system pressure reaching a threshold pressure (e.g., atmospheric pressure), the FTIV (if included) may be commanded closed, and the canister vent valve may be maintained open or commanded closed. Method 600 may then end.

Returning to 605, if it is indicated that the negative pressure relief valve has been previously determined to be functional, as described above with regard to method 500, method 600 may proceed to 615. At 615, responsive to an indication that the negative pressure relief valve is functional, method 600 may include maintaining the ELCM COV in the second position, and maintaining ELCM vacuum pump activation. Furthermore, the FTIV, if included, may be maintained open, and the canister vent valve may be maintained open. As such, at 615, method 600 includes maintaining evacuating the evaporative emissions system and fuel system until a vacuum greater than or equal to the threshold for activation of the negative pressure relief valve (e.g., 256) on the capless fuel filler system is achieved. Because the fuel level is indicated to be above the spud valve, as determined by method 500, the vacuum may be directed through the fuel system vapor recirculation line, as the route through the fuel filler neck via the spud valve is prevented by the fuel level being above the spud valve.

Proceeding to 620, method 600 includes indicating whether the negative pressure relief valve opens responsive to maintaining ELCM vacuum pump activation. As such, at 620, method 600 includes monitoring fuel system pressure via the pressure sensor (e.g., FTPT 291). As described above with regard to the method depicted in FIG. 5, as vacuum continues to build in the fuel system a vacuum relief inflection point may be detected by the pressure sensor responsive to the negative pressure relief valve on the capless fuel filler system being opened (e.g., vacuum-actuated at −20 InH2O). If a vacuum relief inflection point is not indicated at 620, method 600 may proceed to 625. In one example, method 600 may proceed to 625 if a vacuum relief inflection point is not indicated prior to a second predetermined negative threshold pressure being reached. At 625, method 600 may include indicating a restriction in the vapor recirculation line, as vacuum routed through the vapor recirculation line was unable to actuate the negative pressure relief valve in the capless fuel filler system, the negative pressure relief valve previously indicated to be functional. As such, at 625, method 600 may include setting a flag at the controller indicating that a vapor recirculation line restriction test was conducted, and that the results of the test indicated that the vapor recirculation line was restricted. Additionally, at 625, method 600 may include illuminating a malfunction indicator light (MIL), alerting the driver of the need to service the vehicle to mitigate the operational issues associated with a restricted vapor recirculation line. Furthermore, at 625, method 600 may include de-activating the ELCM vacuum pump (e.g., 430), and configuring the ELCM COV in the first position (de-energizing solenoid, e.g., 410). Responsive to fuel system pressure reaching a threshold pressure (e.g., atmospheric pressure), the FTIV (if included) may be commanded closed. Additionally, in some examples the canister vent valve may be commanded closed, however in alternate examples the canister vent valve may be maintained open. In another example, at 625, method 600 may include taking an action responsive to an indication of a restriction in the vapor recirculation line. In one example, a canister purge schedule may be updated to include the results of the vapor recirculation line restriction test. For example, as a result of the vapor recirculation line being restricted, more fuel vapors may be routed to the fuel vapor canister to be adsorbed during refueling events. As such, the fuel vapor canister purging schedule may be updated to increase the frequency and/or scheduling of fuel vapor canister purging operations, such that breakthrough of hydrocarbon vapors to the environment due to a loaded fuel vapor canister may be avoided. In still other examples, due to a restriction in the vapor recirculation line, under conditions wherein fuel level is above the second threshold (e.g., above the spud valve), fuel tank vacuum may not be relieved due to the route to the negative pressure relief valve being restricted. As such, if fuel level is above the spud valve, fuel tank pressure may be monitored, and responsive to an indication that fuel tank vacuum is greater than a threshold level, the FTIV may be commanded open to relieve fuel tank vacuum. Finally, applications wherein vacuum is applied to the fuel system may be reduced under conditions wherein the fuel level is above the spud valve. For example, canister purge operations wherein the FTIV is commanded open to purge fuel vapors from the tank in addition to the fuel vapor canister may be reduced or paused until the restriction in the vapor recirculation line is mitigated. Method 600 may then end.

Returning to 620, if a vacuum relief inflection point is detected by the pressure sensor during the vacuum build prior to reaching a predetermined negative threshold pressure, method 600 may proceed to 630. At 630, method 600 may include indicating the absence of a restriction in the fuel system vapor recirculation line. That a vapor recirculation line restriction test was conducted and that the results indicated an absence of a restriction may be stored at the controller. Furthermore, at 630, method 600 may include de-activating the ELCM vacuum pump (e.g., 430), and configuring the ELCM COV in the first position (de-energizing solenoid 410). Responsive to fuel system pressure reaching a threshold pressure (e.g., atmospheric pressure), the FTIV (if included) may be commanded closed. Additionally, in some examples the canister vent valve may be commanded closed, however in alternate examples the canister vent valve may be maintained open. Method 600 may then end.

FIG. 7 shows an example timeline 700 for conducting a fuel system vapor recirculation line restriction test responsive to an indication that a negative pressure relief valve in a capless fuel filler system is functional according to the methods described herein and with reference to FIGS. 5-6, and as applied to the systems described herein and with reference to FIGS. 1-4C. Timeline 700 includes plot 710, indicating whether vapor recirculation line test conditions are met, and plot 715, indicating whether ELCM evaporative emissions test conditions are met, over time. Timeline 700 further includes plot 720, indicating whether a fuel tank isolation valve (e.g., 252) is open or closed, over time. Timeline 700 further includes plot 725, indicating whether an ELCM changeover valve (COV) is configured in a first position (e.g., FIG. 4A, 4C), or a second position (FIG. 4B), over time. Timeline 700 further includes plot 730, indicating whether an ELCM vacuum pump (e.g., 430) is on or off, over time. Timeline 700 further includes plot 735, indicating pressure as monitored by the ELCM pressure sensor (e.g., 296), over time. Line 736 represents a first threshold vacuum level, indicating a vacuum level corresponding to the vacuum attainable across a reference orifice of specified dimensions. Line 737 represents a second threshold vacuum level, indicating a level of vacuum greater than a level of vacuum expected to open a vacuum-actuated negative pressure relief valve (e.g., 256). Timeline 700 further includes plot 740, indicating whether a negative pressure relief valve (e.g., 256) in a capless fuel filler system, is functional, over time. Timeline 700 further includes plot 745, indicating a fuel level in a fuel tank, over time. Line 746 represents a threshold fuel level, above which indicates a fuel level above a fuel tank spud valve (e.g., 236), and below which indicates a fuel level below the fuel tank spud valve. Timeline 700 further includes plot 750, indicating whether a key-off event has been detected, over time. Timeline 700 further includes plot 755, indicating whether undesired evaporative emissions have been detected, over time. Timeline 700 further includes plot 760, indicating whether a restriction in the fuel system vapor recirculation line (e.g., 231) has been detected, over time. Timeline 700 further includes plot 765, indicating the open or closed state of a canister vent valve (e.g., 297), over time.

At time $t_0$, the vehicle is in operation, as a key-off event has not been indicated, illustrated by plot 750. As a key-off event is not indicated, vapor recirculation line test conditions are not met, indicated by plot 710. Furthermore, ELCM evaporative emissions test entry conditions are not met, indicated by plot 715. As one example, ELCM evaporative emissions test entry conditions may not be met due to a fuel vapor canister purging operation in progress. The FTIV is closed, indicated by plot 720, thus sealing the fuel tank. Canister vent valve (CVV) is open, indicated by plot 765. ELCM COV is configured in a first position (e.g., FIG. 4A, 4C), indicated by plot 725, and the ELCM pump is deactivated, indicated by plot 730. As the ELCM COV is in the first position with the ELCM pump off and the CVV in an open configuration, the ELCM pressure sensor (e.g., 296), indicates atmospheric pressure. Fuel level in the tank is above the spud valve (represented by line 746), indicated by plot 745. The negative pressure relief valve has been previously indicated to be functional, indicated by plot 740, wherein functionality of the negative pressure relief valve may be determined according to the method 500 depicted in FIG. 5. Furthermore, undesired evaporative emissions in the evaporative emissions control system (e.g., 251) and/or fuel system (e.g., 218) are not indicated, illustrated by plot 755, and fuel system vapor recirculation line restriction is not indicated, illustrated by plot 760.

At time $t_1$ a key-off event is detected. At time $t_2$, entry conditions for an ELCM evaporative emissions test are indicated to be met. As such, the ELCM pump is activated with the COV configured in the first position. As described above with regard to FIG. 4A, in this position the ELCM pump (e.g. 430) may draw a vacuum on reference orifice (e.g., 440), and pressure sensor (e.g., 435) may record the vacuum level within the ELCM (e.g., 295). This reference check vacuum level reading may then become the threshold for passing the subsequent ELCM evaporative emissions test. Accordingly, between time $t_2$ and $t_3$ vacuum level as monitored by the ELCM pressure sensor builds to a first threshold level, represented by line 736. At time $t_3$, the ELCM pump is deactivated and the pressure returns to atmospheric pressure between time $t_3$ and $t_4$.

At time $t_4$ the FTIV is commanded open, indicated by plot 715, the ELCM COV is commanded to the second configuration, indicated by plot 725, and the ECLM pump is activated, indicated by plot 730. With the ELCM COV in the second position (e.g., FIG. 4B), the ELCM pump activated, and the FTIV open, vacuum may be drawn on the evaporative emissions control system and the fuel system. Accordingly, between time $t_4$ and $t_5$ vacuum steadily builds in the evaporative emissions control system and fuel system, as monitored by the ELCM pressure sensor (e.g., 435). At time $t_5$ the level of vacuum build reaches the threshold line set by the reference check as described above. As such, it may be indicated that the evaporative emissions control system and fuel system are free from undesired evaporative emissions. Accordingly, the results of the ELCM evaporative emissions test may be recorded at the controller, and the test completed, as indicated by plot 715. Furthermore, as undesired evaporative emissions are not indicated, the level of fuel is indicated to be above the spud valve, illustrated by plot 745, and the negative pressure relief valve has been previously indicated to be functional, illustrated by plot 740, it may be indicated that test conditions are met for a fuel system vapor recirculation line restriction test, illustrated by plot 710. Accordingly, between time $t_5$ and $t_6$ the ELCM vacuum pump is maintained on with the COV configured in the second position, the FTIV maintained open, and the CVV maintained open. As such, between time $t_5$ and $t_6$ the level of vacuum as monitored by the ELCM pressure sensor is observed to continue to build.

At time $t_6$ the level of vacuum build reaches a second threshold, represented by line 737. As the level of vacuum has reached the second threshold, it may be determined that the negative pressure relief valve did not open responsive to the vacuum build. As the level of fuel in the fuel tank was indicated to be above the level of the spud valve, the only route for the vacuum to evacuate the negative vacuum relief valve is via the vapor recirculation line (e.g., 231). As such, because the negative pressure relief valve was previously determined to be functional, at time $t_6$ a restriction in the vapor recirculation line is indicated, illustrated by plot 760. Furthermore, as a restriction in the vapor recirculation line is indicated, a flag may be set at the controller and a malfunction indicator light (MIL) may be illuminated. Additionally, a canister purge schedule may be updated to include the results of the vapor recirculation line restriction test. As a restriction in the vapor recirculation line is indicated, the ECLM pump is deactivated, indicated by plot 730 and the ELCM COV is commanded to the first position, indicated by plot 725. With the ELCM pump deactivated, the ELCM COV in the first position, the CVV open, and the FTIV open, between time $t_6$ and $t_7$ vacuum in the evaporative emissions control system and fuel system is relieved, and at time $t_7$ pressure as monitored by the ELCM pressure sensor indicates atmospheric pressure. Accordingly, as pressure in the fuel system has been relieved to atmospheric pressure, the FTIV is commanded closed to seal the fuel tank. Between time $t_7$ and $t_8$ the vehicle remains in key-off mode, and the controller may be placed in a sleep mode of operation.

In this way, restrictions in a fuel system vapor recirculation line may be indicated via onboard means based on pressure profiles obtained during evacuation of an evaporative emissions control system and fuel system under conditions wherein the level of fuel is both below the level of a spud valve, and above the level of the spud valve. First, functionality of a negative pressure relief valve in a capless refueling system may be determined responsive to an indication of a fuel level below the spud valve, by monitoring pressure in the fuel system as vacuum is built to the level wherein the negative pressure relief valve is designed to open. If the negative pressure relief valve is functioning as designed, a vacuum relief inflection point may be indicated. Applying vacuum responsive to an indication that the fuel level is below the spud valve ensures that the vacuum is routed to the negative pressure relief valve through the spud valve and the fuel filler neck, as this route is less restrictive than the route through the fuel system vapor recirculation line. Having established that the negative pressure relief valve is functional, responsive to an indication that the fuel level is above the spud valve, by monitoring pressure in the fuel system as vacuum is built to the level wherein the negative pressure relief valve is designed to open, a restriction in the vapor recirculation line may be indicated if a vacuum relief inflection point is not observed. Applying vacuum responsive to an indication that the fuel level is above the spud valve ensures that the vacuum is routed to the negative pressure relief valve via the recirculation line.

The technical effect of indicating a restriction in a fuel system vapor recirculation line based on pressure profiles obtained during evacuation the evaporative emissions control system and fuel system based on fuel level is to make use of vacuum utilized for emissions test diagnostics to further indicate whether a restriction is present in the vapor recirculation line. For example, vacuum present in the fuel system subsequent to an emissions test may be used to indicate whether a negative pressure relief valve is functional under conditions where a fuel level is below a spud valve. During a subsequent evaporative emissions test, vacuum present in the fuel system may further be used to indicate whether a restriction is present in the vapor recirculation line, responsive to an indication of a fuel level above the spud valve. As such, a further technical effect of indicating a restriction in the vapor recirculation line is to route vacuum to the negative pressure relief valve via different pathways, based on the level of fuel in the tank. By doing so, indication of a restriction in the vapor recirculation line may be conclusively indicated.

The systems described herein and with reference to FIGS. 1-4C, along with the methods described herein and with reference to FIGS. 5-6, may enable one or more systems and one or more methods. In one example, a method comprises responsive to a fuel tank fill level below a first threshold, applying vacuum to the fuel system to generate a first fuel system pressure profile; responsive to a fuel tank fill level above a second threshold, applying vacuum to the fuel system to generate a second fuel system pressure profile; and indicating a restriction in a vapor recirculation line based on the first and second fuel system pressure profiles. In a first example of the method, the method includes wherein the fuel tank is coupled in a fuel system within a vehicle, wherein the pressure profiles are pressure profiles over time, and wherein the fuel tank is coupled to a fuel filler neck via a spud valve, the fuel filler neck coupled to a negative pressure relief valve; taking an action in response to the indicated restriction; and wherein the first threshold level comprises a fuel level below the spud valve, and wherein the second threshold level comprises a fuel level above the spud valve, wherein the fuel tank fill level below a first threshold comprises a first condition and the fuel tank fill level above the second threshold comprises a second, different, condition, wherein none of the pressure profile of the first condition overlaps a duration of the pressure profile of the second condition. A second example of the method optionally includes the first example and further wherein indicating a restriction in the vapor recirculation line further comprises indicating a restriction responsive to both the first fuel system pressure profile including a vacuum relief inflection point during applying vacuum in the first condition, and the second fuel system pressure profile not including a vacuum relief inflection point during applying vacuum in the second condition. A third example of the method optionally includes any one or more or each of the first and second examples and further comprises routing vacuum through the fuel tank to the negative pressure relief valve via the fuel filler neck. A fourth example of the method optionally includes any one or more or each of the first through third examples and further comprises routing vacuum to the negative pressure relief valve via the vapor recirculation line. A fifth example of the method optionally includes any one or more or each of the first through fourth examples and further comprises indicating the negative pressure relief valve is functional responsive to an indication of a vacuum relief inflection point during applying vacuum in the first condition; and indicating an absence of restriction in the vapor recirculation line responsive to an indication of a vacuum relief inflection point during applying the vacuum in the second condition, wherein it was previously indicated that the negative pressure relief valve is functional. A sixth example of the method optionally includes any one or more or each of the first through fifth examples and further includes wherein during applying vacuum during both the first condition and the second condition, the vacuum relief inflection point corresponding to the first fuel system pressure profile and the vacuum relief inflection point corresponding to the second fuel system pressure profile indicates opening of the negative pressure relief valve. A seventh example of the method optionally includes any one or more or each of the first through sixth examples and further includes wherein both the first condition and the second condition further comprise: stopping applying vacuum and relieving fuel system vacuum to atmosphere if a threshold vacuum level is reached, the threshold vacuum level comprising a vacuum level greater than a level expected to actuate the negative pressure relief valve. An eighth example of the method optionally includes any one or more or each of the first through seventh examples and further comprises fluidically coupling the fuel system to a fuel vapor canister configured within an evaporative emissions control system by opening a fuel tank isolation valve; and wherein applying vacuum to the fuel system includes opening the fuel tank isolation valve, and activating a vacuum pump positioned within a vent line between the fuel vapor canister and atmosphere to draw vacuum on the evaporative emissions control system and fuel system. A ninth example of the method optionally includes any one or more or each of the first through eighth examples and further comprises prior to applying vacuum on the fuel system, indicating a reference vacuum level by applying vacuum via the vacuum pump to a reference orifice; and during applying vacuum on the fuel system: indicating undesired evaporative emissions responsive to a fuel system vacuum level less than the reference vacuum level after a predetermined time period. A tenth example of the method optionally includes any one or more or each of the first through ninth examples and further comprises responsive to an indication of the fuel system vacuum greater than or equal to the reference vacuum level after a predetermined time period: maintaining applying vacuum on the fuel system during the first condition and the second condition.

Another example of a method comprises during evacuating an evaporative emissions control system and fuel system to conduct an evaporative emissions test with an onboard vacuum pump; monitoring pressure in the evaporative emissions control system and fuel system; and responsive to an indication of an absence of undesired evaporative emissions: in a first condition, including a fuel level in a fuel tank below a first threshold level, maintaining evacuating the evaporative emissions control system and fuel system and indicating a negative pressure relief valve in a capless fuel filler system is functional responsive to a vacuum relief inflection point; and in a second condition, including the fuel level in the fuel tank above a second threshold level and an indication that the negative pressure relief valve is functional, maintaining evacuating the evaporative emissions control system and fuel system and indicating a restriction in a fuel system vapor recirculation line responsive to an absence of a vacuum relief inflection point. In a first example of the method, the method further comprises fluidically coupling the fuel tank to the negative pressure relief valve in the capless fuel filler system via a fuel filler neck, the fuel filler neck coupled to the fuel tank via a spud valve; and wherein the first threshold level comprises the fuel level below the spud valve, and wherein the second threshold level comprises the fuel level above the spud valve. A second example of the method optionally includes the first example and further includes wherein the first condition includes routing vacuum to the negative pressure relief valve via the fuel filler neck through the spud valve, the fuel filler neck comprising a less restrictive path to the negative pressure relief valve than a path through the fuel system vapor recirculation line. A third example of the method optionally includes any one or more or each of the first and second examples and further includes wherein the second condition includes routing vacuum to the negative pressure relief valve via the fuel system vapor recirculation line. A fourth example of the method optionally includes any one or more or each of the first through third examples and further comprises prior to evacuating the evaporative emissions control system and fuel system to conduct an evaporative emissions test: activating the onboard vacuum pump; drawing a vacuum across a reference orifice; determining a reference vacuum level; and wherein during evacuating the evaporative emissions control system and fuel system, an indication of an absence of undesired evaporative emissions includes attaining a vacuum level in the evaporative emissions control system and fuel system equal to or greater than the reference vacuum level after a predetermined time period. A fifth example of the method optionally includes any one or more or each of the first through fourth examples and further includes wherein both the first and the second conditions further comprise: stopping maintaining evacuating the evaporative emissions control system and fuel system responsive to the vacuum level in the evaporative emissions control system and fuel system reaching a second threshold vacuum level, wherein a vacuum relief inflection point in both the first condition and the second condition is not indicated, the vacuum relief inflection point in both the first condition and the second condition comprising opening of the negative pressure relief valve. A sixth example of the method optionally includes any one or more or each of the first through fifth examples and further includes wherein the second threshold vacuum level comprises a vacuum level greater than a level of vacuum expected to open the negative pressure relief valve.

An example of a system for a vehicle comprises a fuel tank configured within a fuel system; a fuel vapor canister, configured within an evaporative emissions control system, coupled to the fuel tank via a fuel tank isolation valve, and coupled to atmosphere via a canister vent valve positioned in a vent line; a vacuum pump positioned between the fuel vapor canister and the canister vent valve within the vent line; a fuel filler neck coupling the fuel tank to a capless fuel filler system via a spud valve; a negative pressure relief valve coupled within the capless fuel filler system; a fuel level sensor; a fuel tank pressure transducer; a fuel vapor recirculation line coupling the fuel tank to the capless fuel filler system; a controller storing instructions in non-transitory memory, that when executed, cause the controller to: determine a reference vacuum threshold by drawing a vacuum via the vacuum pump on a reference orifice; evacuate the evaporative emissions control system and fuel system by commanding open the fuel tank isolation valve, commanding open the canister vent valve, and activating the vacuum pump; indicate an absence of undesired evaporative emissions responsive to a vacuum build equal to or greater than the reference vacuum threshold as monitored by the fuel tank pressure transducer; indicate a fuel level in the fuel tank via the fuel level sensor; maintain evacuating the evaporative emissions control system and fuel system responsive to an indication of the absence of undesired evaporative emissions and whether the fuel level is below a first threshold or above a second threshold, the first threshold comprising the fuel level below the spud valve, and the second threshold comprising the fuel level above the spud valve; and in a first condition, including the fuel level below the first threshold, indicate a first fuel system pressure profile during maintaining evacuating the evaporative emissions control system and fuel system; in a second condition, including the fuel level above the second threshold, indicate a second fuel system pressure profile during maintaining evacuating the evaporative emissions control system and fuel system; and indicate a restriction in the vapor recirculation line based on the first and second fuel system pressure profiles. In a first example, the system further includes wherein the controller further stores instructions in non-transitory memory, that when executed, cause the controller to: indicate a restriction in the vapor recirculation line responsive to both the first fuel system pressure profile including a vacuum relief inflection point during maintaining evacuating the evaporative emissions control system and fuel system in the first condition, and the second fuel system pressure profile not including a vacuum relief inflection point during maintaining evacuating the evaporative emissions control system and fuel system in the second condition; wherein the vacuum relief inflection point in both the first and second conditions includes opening of the negative pressure relief valve; and wherein the first condition includes routing vacuum through the fuel tank to the negative pressure relief valve via the fuel filler neck, and wherein the second condition includes routing vacuum to the negative pressure relief valve via the vapor recirculation line.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to a fuel tank fill level below a first threshold, applying vacuum to a fuel system to generate a first fuel system pressure profile;
responsive to a fuel tank fill level above a second threshold, applying vacuum to the fuel system to generate a second fuel system pressure profile; and
indicating a restriction in a vapor recirculation line based on the first and second fuel system pressure profiles, wherein:
a fuel tank is coupled in the fuel system within a vehicle, wherein the pressure profiles are pressure profiles over time, and wherein the fuel tank is coupled to a fuel filler neck via a spud valve, the fuel filler neck coupled to a negative pressure relief valve;
taking an action in response to the indicated restriction; and
wherein the first threshold comprises a fuel level below the spud valve, and wherein the second threshold comprises a fuel level above the spud valve, wherein the fuel tank fill level below the first threshold comprises a first condition and the fuel tank fill level above the second threshold comprises a second, different, condition, wherein none of the pressure profile of the first condition overlaps a duration of the pressure profile of the second condition.

2. The method of claim 1, wherein indicating the restriction in the vapor recirculation line further comprises:
indicating the restriction responsive to both the first fuel system pressure profile including a vacuum relief inflection point during applying vacuum in the first condition, and the second fuel system pressure profile not including a vacuum relief inflection point during applying vacuum in the second condition.

3. The method of claim 1, wherein the first condition further comprises:
routing vacuum through the fuel tank to the negative pressure relief valve via the fuel filler neck.

4. The method of claim 1, wherein the second condition further comprises:
routing vacuum to the negative pressure relief valve via the vapor recirculation line.

5. The method of claim 2, further comprising:
indicating the negative pressure relief valve is functional responsive to an indication of a vacuum relief inflection point during applying vacuum in the first condition; and
indicating an absence of restriction in the vapor recirculation line responsive to an indication of a vacuum relief inflection point during applying the vacuum in the second condition, wherein it was previously indicated that the negative pressure relief valve is functional.

6. The method of claim 2, wherein, during applying vacuum during both the first condition and the second condition, a vacuum relief inflection point corresponding to the first fuel system pressure profile and a vacuum relief inflection point corresponding to the second fuel system pressure profile indicates opening of the negative pressure relief valve.

7. The method of claim 6, wherein both the first condition and the second condition further comprise:
stopping applying vacuum and relieving fuel system vacuum to atmosphere if a threshold vacuum level is reached, the threshold vacuum level comprising a vacuum level greater than a level expected to actuate the negative pressure relief valve.

8. The method of claim 2, further comprising:
fluidically coupling the fuel system to a fuel vapor canister configured within an evaporative emissions control system by opening a fuel tank isolation valve;
wherein applying vacuum to the fuel system includes opening the fuel tank isolation valve, and activating a vacuum pump positioned within a vent line between the fuel vapor canister and atmosphere to draw vacuum on the evaporative emissions control system and the fuel system.

9. The method of claim 8, further comprising:
prior to applying vacuum to the fuel system,
indicating a reference vacuum level by applying vacuum via the vacuum pump to a reference orifice; and
during applying vacuum to the fuel system,
indicating undesired evaporative emissions responsive to a fuel system vacuum level less than the reference vacuum level after a predetermined time period.

10. The method of claim 9, further comprising:
responsive to an indication of fuel system vacuum greater than or equal to the reference vacuum level after the predetermined time period:
maintaining applying vacuum to the fuel system during the first condition and the second condition.

11. A method comprising:
during evacuating an evaporative emissions control system and a fuel system to conduct an evaporative emissions test with an onboard vacuum pump;
monitoring pressure in the evaporative emissions control system and the fuel system; and
responsive to an indication of an absence of undesired evaporative emissions:
in a first condition, including a fuel level in a fuel tank below a first threshold level, maintaining evacuating the evaporative emissions control system and the fuel system and indicating a negative pressure relief valve in a capless fuel filler system is functional responsive to a vacuum relief inflection point; and
in a second condition, including the fuel level in the fuel tank above a second threshold level and an indication that the negative pressure relief valve is functional, maintaining evacuating the evaporative emissions control system and the fuel system and indicating a restriction in a fuel system vapor recirculation line responsive to an absence of a vacuum relief inflection point.

12. The method of claim 11, further comprising:
fluidically coupling the fuel tank to the negative pressure relief valve in the capless fuel filler system via a fuel filler neck, the fuel filler neck coupled to the fuel tank via a spud valve;
wherein the first threshold level comprises a fuel level below the spud valve, and wherein the second threshold level comprises a fuel level above the spud valve.

13. The method of claim 12, wherein the first condition includes routing vacuum to the negative pressure relief valve via the fuel filler neck through the spud valve, the fuel filler neck comprising a less restrictive path to the negative pressure relief valve than a path through the fuel system vapor recirculation line.

14. The method of claim 11, wherein the second condition includes routing vacuum to the negative pressure relief valve via the fuel system vapor recirculation line.

15. The method of claim 11, further comprising:
prior to evacuating the evaporative emissions control system and the fuel system to conduct the evaporative emissions test:
  activating the onboard vacuum pump;
  drawing a vacuum across a reference orifice; and
  determining a reference vacuum level;
wherein, during evacuating the evaporative emissions control system and the fuel system, an indication of an absence of undesired evaporative emissions includes attaining a vacuum level in the evaporative emissions control system and the fuel system equal to or greater than the reference vacuum level after a predetermined time period.

16. The method of claim 11, wherein both the first and second conditions further comprise:
stopping maintaining evacuating the evaporative emissions control system and the fuel system responsive to a vacuum level in the evaporative emissions control system and the fuel system reaching a second threshold vacuum level, wherein a vacuum relief inflection point in both the first condition and the second condition is not indicated, the vacuum relief inflection point in both the first condition and the second condition comprising opening of the negative pressure relief valve.

17. The method of claim 16, wherein the second threshold vacuum level comprises a vacuum level greater than a level of vacuum expected to open the negative pressure relief valve.

\* \* \* \* \*